No. 851,279. PATENTED APR. 23, 1907.
E. E. DOBBS.
DRESS CHART.
APPLICATION FILED JULY 16, 1906.
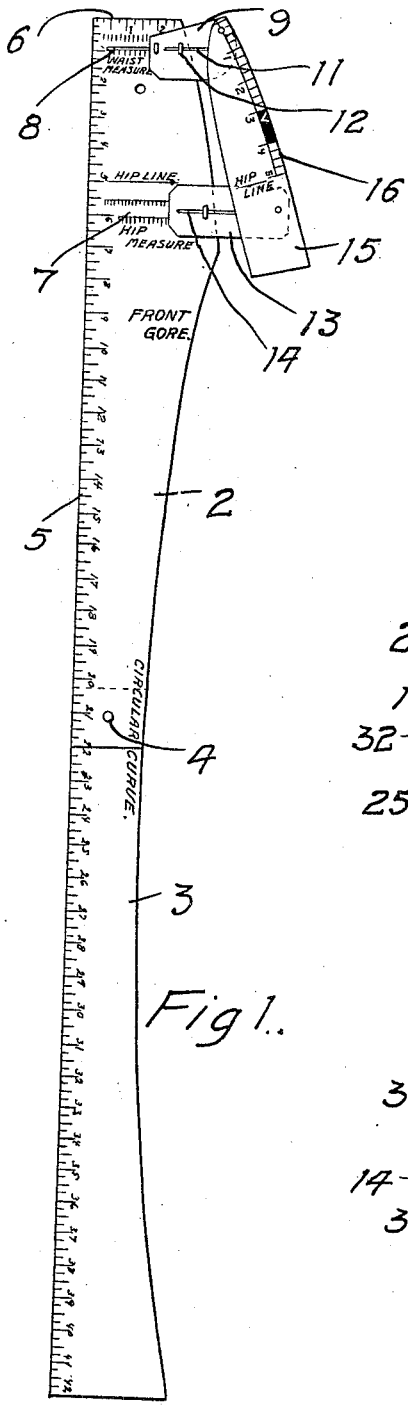
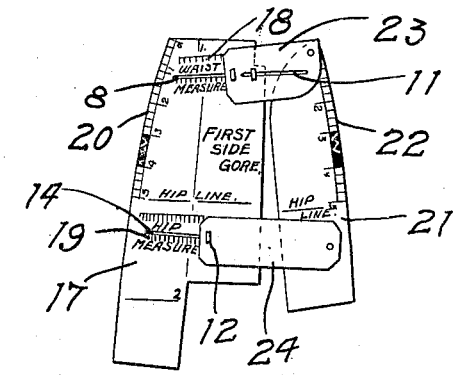
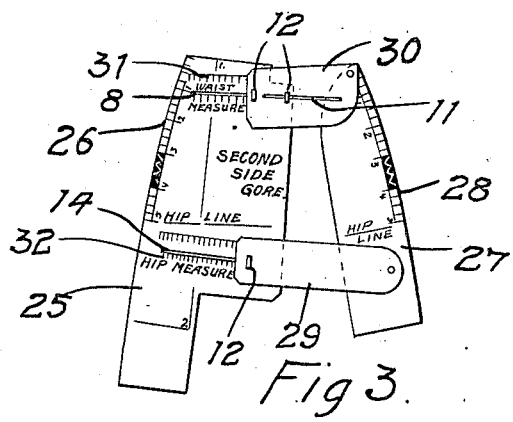
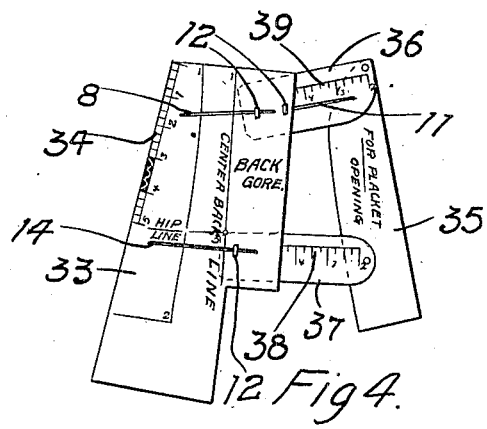
WITNESSES
INVENTOR
EDWIN E. DOBBS
BY
HIS ATTORNEYS

UNITED STATES PATENT OFFICE.

EDWIN EUGENE DOBBS, OF MINNEAPOLIS, MINNESOTA.

DRESS-CHART.

No. 851,279.  Specification of Letters Patent.  Patented April 23, 1907.

Application filed July 16, 1906. Serial No. 326,323.

*To all whom it may concern:*

Be it known that I, EDWIN EUGENE DOBBS, of Minneapolis, Hennepin county, Minnesota, have invented certain new and useful Improvements in Dress-Charts, of which the following is a specification.

The object of my invention is to provide a chart from which a pattern for a dress skirt can be easily and quickly made.

A further object is to provide a chart capable of adjustment to adapt it for making patterns of different sizes.

My invention consists generally in a dress chart all as hereinafter described and particularly pointed out in the claims.

In the accompanying drawing, forming part of this specification; Figure 1 is a plan view of the chart for the front gore showing it extended. Fig. 2 is a similar view of the chart for the first side gore. Fig. 3 is a plan view of the chart for the second side gore. Fig. 4 is a plan view of the chart for the back gore.

In the drawing, I have shown different sections used for marking out a skirt pattern and in which, 2 represents a plate whereon an extension 3 is pivoted at 4 to coincide therewith, or as shown in the figure to form a continuation or extension of the plate 2. The plates may be made in one piece, but I prefer to provide the hinged sections for convenience in handling and transportation. When the plates are extended, the scale 5 on one edge is utilized to determine the particular length of the skirt. At the top of the plate 2 is a transverse scale 6 representing the waist measure and below and parallel with the waist measure scale, is a scale 7 for the hip measure. A transverse slot 8 is provided near the scale 6 and a plate 9 has a slot 11 and is adjustably attached to the plate 2 by the fastening device 12. A second plate 13 has a slot 14 adjustably connected with the plate 2 by fastening devices similar to those employed in connection with the plate 9. A plate 15 is pivotally attached at its ends to the plates 9 and 13 and is provided with a scale 16.

The first side gore chart shown in Fig. 2 comprises a plate 17 having waist and hip measure scales 18 and 19 and a longitudinal scale 20 and a gore chart 21 also having a longitudinal scale 22, and pivoted at its ends on plates 23 and 24 which have adjustable connections with the plate 17 corresponding to those described with reference to the plate 2. The slots and fastening devices being almost identical in each section, the same reference figures may be employed for both.

The second side gore consists of a plate 25 having a longitudinal scale 26 and a gore plate 27 with a scale 28 and plates 29 and 30 pivotally connected to the ends of the plate 27 and adjustable on the plate 25 over the scales 31 and 32 thereon.

The back gore plate 33 has a scale 34 and a plate 35 pivotally connected at its ends to plates 36 and 37 which are provided with scales 38 and 39 and adjustably attached to the plate 33 by means of slots and fasteners corresponding to those heretofore described.

In using the chart the measure of the person is taken in the usual way and the plates set with their scales representing the measure and when each section has been adjusted the operator can place them on the paper and mark out the pattern therefrom.

I claim as my invention:

1. A skirt chart having a front gore plate 2 and a plate 3 pivotally connected therewith at one end and adapted to be folded to coincide with one another, said plates having a scale on one longitudinal edge which when the plates are extended, forms the measure for the length of the skirt, the opposite longitudinal edges of the plates being curved and the plate 2 having near its upper end transverse scales representing respectively the waist and hip measures and a gore plate also having a scale and slidably attached to said plate 2 and adjustable thereon, with respect to said waist and hip measures, substantially as described.

2. In a skirt chart, a plate representing a gore having a longitudinal scale and transverse scales representing the waist and hip measure and a gore plate having a longitudinal scale on its outer edge and plates having sliding connections with said first gore plate over said waist and hip measures and on which sliding plates, said gore plate is pivotally mounted, substantially as described.

In witness whereof, I have hereunto set my hand this 11th day of July 1906.

EDWIN EUGENE DOBBS.

Witnesses:
RICHARD PAUL,
J. H. BALDWIN.